(No Model.)

A. L. HOLLANDER.
DUST PAN.

No. 504,879. Patented Sept. 12, 1893.

WITNESSES:

INVENTOR:

UNITED STATES PATENT OFFICE.

ALVA L. HOLLANDER, OF MILLIS, ASSIGNOR TO THE STEEL EDGE STAMPING AND RETINNING COMPANY, OF BOSTON, MASSACHUSETTS.

DUST-PAN.

SPECIFICATION forming part of Letters Patent No. 504,879, dated September 12, 1893.

Application filed January 26, 1893. Serial No. 459,816. (No model.)

*To all whom it may concern:*

Be it known that I, ALVA L. HOLLANDER, of Millis, in the county of Norfolk and State of Massachusetts, have invented certain new and useful Improvements in Dust-Pans, of which the following is a specification.

The object of this invention is to provide an improved way of attaching handles to dust-pans, which will obviate the use of solder for this purpose, thereby permitting the employment of enameled ware for the pan and handle. It is well-known that, in enameled ware, a soldered seam or joint cannot be employed, for the reason that the ware is subjected, during the process of enameling, to a heat which would destroy such a seam or joint. Therefore I have devised an all-metal connection, by which handles may be attached to dust-pans so as to permit the use of enameled sheet metal for these articles.

The invention is illustrated in the accompanying drawings, in which—

Figure 1:
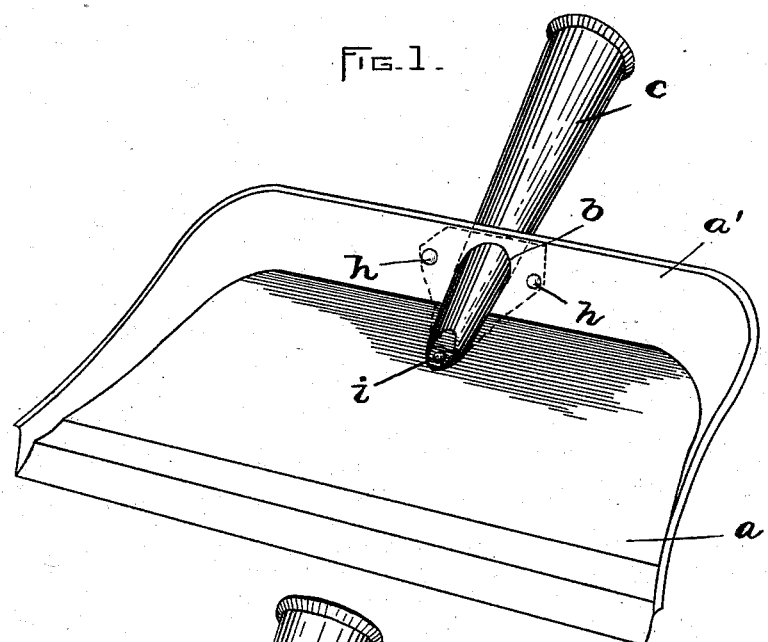
Figure 2:
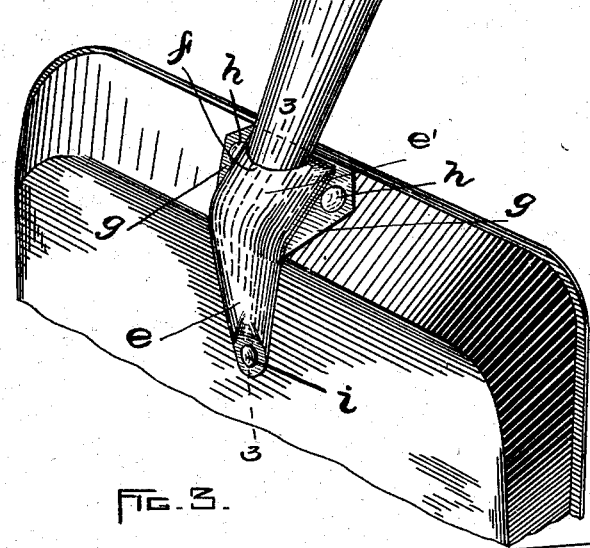
Figure 3:
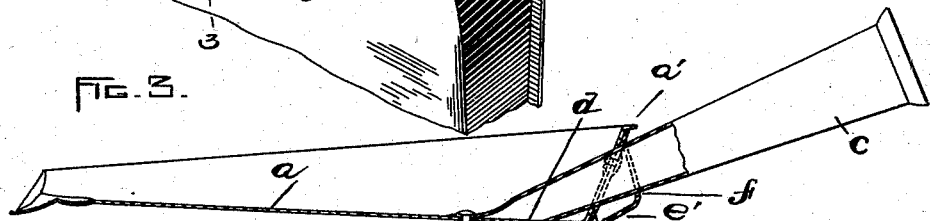

Figure 1 shows a perspective view of a dust-pan, with a handle attached according to my invention. Fig. 2 shows a perspective view of the back and under side of the pan. Fig. 3 shows a section on the line 3—3 of Fig. 2.

The same letters of reference indicate the same parts in all the figures.

In the drawings, the reference letter $a$ designates the bottom of the pan, and $a'$ the back-flange or guard. An oblong opening $b$ is made at the middle of this back-flange or guard $a'$, and the handle, which is of the usual tapered form, is inserted through this oblong hole, and its end is beveled, as shown at $d$, so as to rest squarely on the bottom of the pan, while the handle extends at an angle thereto. A brace-piece or socket is secured on the outer side of the pan, and comprises a tongue $e$, which fits against the under side of the pan-bottom; a portion $e'$, extending up behind the back-flange $a'$ of the pan and having an opening $f$ through which the handle $c$ passes; and flanges $g$, fitting against the back-flange of the pan. Rivets $h$ extend through the said flanges $g$ and the back-flange of the pan, and secure these parts rigidly together. A single rivet $i$ passes through the inner end of the handle $c$, the pan-bottom, and the tongue $e$ of the brace-piece on the outer side of the pan. By this arrangement, the handle is attached to the pan without the use of solder, and the handle serves as a brace between the bottom and back-flange of the pan. The brace-piece on the outer side of the pan serves to sustain the handle and also strengthens the pan where the handle is attached. The single rivet $i$, being passed through the three thicknesses of the metal, as heretofore described, is not likely to loosen or pull out. The portion $e'$ of the brace-piece is bulged, thereby forming a hump to support the handle where it extends back from the pan.

Having thus described my invention, what I claim as new, and desire to secure by Letters Patent, is—

1. The combination of a dust-pan, having a back-flange with an opening through it; a handle extending through said opening and fitting against the bottom of the pan; a brace-piece engaging the under side of the pan-bottom, and extending behind the back-flange of the pan and having an opening through which the handle extends; and a fastening, passing through the handle, the pan bottom and the brace-piece.

2. The combination of a dust-pan, having a back-flange with an opening through it; a handle, extending through said opening and secured to the bottom of the pan; and a brace-piece, secured to the outer side of the back-flange of the pan, and having an opening through which the handle passes, and extending under and secured to the bottom of the pan.

In testimony whereof I have signed my name to this specification, in the presence of two subscribing witnesses, this 18th day of January, A. D. 1893.

ALVA L. HOLLANDER.

Witnesses:
FRED L. ROBERTS,
C. A. SARONI.